United States Patent
Cohen

(10) Patent No.: US 6,236,330 B1
(45) Date of Patent: *May 22, 2001

(54) MOBILE DISPLAY SYSTEM

(75) Inventor: Eyal Cohen, New York, NY (US)

(73) Assignee: Adapt Media, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/416,066

(22) Filed: Oct. 12, 1999

Related U.S. Application Data

(63) Continuation-in-part of application No. 09/185,061, filed on Nov. 3, 1998, now Pat. No. 6,060,993.

(51) Int. Cl.[7] .................................................. G08B 5/00
(52) U.S. Cl. ................ 340/691.6; 340/988; 340/990; 340/425.5; 340/463; 340/464; 705/1; 705/14; 235/383; 40/591; 40/592
(58) Field of Search ........................... 340/691.6, 990, 340/988, 425.5, 463, 464; 705/1, 14, 26; 235/383; 358/1.15; 40/661.03, 591, 592

(56) References Cited

U.S. PATENT DOCUMENTS

| | | | |
|---|---|---|---|
| 4,888,709 | * 12/1989 | Revesz et al. ....................... 358/1.15 |
| 5,250,789 | * 10/1993 | Johnsen ................................ 235/383 |
| 5,287,266 | * 2/1994 | Malec et al. ............................. 705/1 |
| 5,295,064 | * 3/1994 | Malec et al. ............................. 705/1 |
| 5,438,780 | 8/1995 | Winner ................................. 40/514 |
| 5,543,856 | 8/1996 | Rosser et al. ......................... 348/578 |
| 5,552,772 | 9/1996 | Janky et al. ....................... 340/573.4 |
| 5,627,549 | 5/1997 | Park ..................................... 701/300 |
| 5,646,616 | * 7/1997 | Komatsu .............................. 340/988 |
| 5,657,566 | 8/1997 | Key ........................................ 40/590 |
| 5,664,948 | 9/1997 | Dimitriadis et al. ............. 434/304 R |
| 5,708,782 | * 1/1998 | Larson et al. ........................... 705/14 |
| 5,767,795 | 6/1998 | Schaphorst ........................... 340/988 |
| 5,821,513 | * 10/1998 | O'hagan et al. ...................... 235/383 |
| 5,880,449 | * 3/1999 | Teicher et al. ....................... 235/383 |
| 5,933,813 | * 8/1999 | Teicher et al. ......................... 705/26 |
| 6,012,244 | * 1/2000 | Begum et al. .................... 40/661.03 |
| 6,060,993 | * 5/2000 | Cohen ............................... 340/691.6 |

* cited by examiner

Primary Examiner—Benjamin C. Lee
(74) Attorney, Agent, or Firm—Natter & Natter

(57) ABSTRACT

A mobile display system comprises one or more movable billboard displays, equipped with externally viewable display panels and a controller. The display is moved from location zone to location zone by a transporter which may comprise a person or a vehicle. The controller ascertains the display location and drives the display to generate a publicly viewable message selected for viewing within such location zone. The message is displayed pursuant to a schedule which includes date, time of day and display duration while the display is within the zone or until the display is located in another zone which is not included within the message schedule. A tiered system control network includes a plurality of fixed stations which transmit message content and scheduling data to the controller and which generate billing and other accounting records. An advertiser may communicate with the network for creating and changing message content and scheduling data.

17 Claims, 3 Drawing Sheets

MOBILE DISPLAY SYSTEM

RELATED APPLICATIONS

This application is a continuation-in-part of application Ser. No. 09/185,061, filed Nov. 3, 1998 entitled Mobile Display System, now U.S. Pat. No. 6,060,993.

BACKGROUND OF THE INVENTION

1. Field of the Invention

This invention relates generally to systems for presenting a visual display of information for advertising or other purposes and more specifically to a system which includes movable visual displays with associated controllers for geographic and time sensitive display message content.

2. Background History

Mobile displays have proven to be as an effective advertising medium and has remained intact from inception in virtually all formats, from the person wearing a sandwich board to the ice cream vendor's truck with an illustration of an ice cream popcicle, trucks indicating the source of their contents, taxi, bus, railroad and subway car billboards and more recent innovations, such as, buses entirely wrapped in electrostatic marking film carrying advertising graphics as well as cargoless vehicles carrying billboards traversing streets of metropolitan areas.

Advertising was known to be time and location sensitive. Among the disadvantages heretofore encountered with visual displays has been the inability to efficiently deliver the intended message to a target audience in desired geographic zones and specified time slots so that advertising revenues could be maximized in accordance with the value delivered.

For example, a local dry cleaning establishment on the upper west side of a city might wish to target only upper west side customers while a movie theater in the same locale may wish to target potential customers from a larger geographic base.

The dry cleaning establishment with a limited advertising budget desired to pay for mobile billboard advertising only when the billboard was in the upper west side while, the movie theater perceived value in displaying its billboard message throughout the city.

Similarly, business which desired to attract children, e.g. amusement parks, did not wish to bear costs associates with mobile billboard displays when their target customers were not available, e.g. during the times of day when children were in school or in the late evening.

There was a further need to target precise visual messages directed to a particular location and time of day at minimal expense.

The advertiser's needs with respect to receiving advertising billing which reflected specific desired dates, times of day, duration of display, specific locale wherein the advertiser's message was displayed were also unfulfilled.

Mobile billboards heretofore known were deficient in providing versatility in these and several other aspects.

SUMMARY OF THE INVENTION

A mobile visual display system comprises one or more billboard display panels capable of delivering changeable messages e.g., LED, liquid crystal, etc., and an associated programmable controller which drives the display panels to provide a viewable message. The controller ascertains that the billboard is within a predefined geographic zone which can be customized for each message and drives the display to generate a message selected for targeted public viewing. The message is displayed pursuant to a schedule which includes date, time of day and display duration while the billboard is within the zone or until the billboard is located in another zone which is not within the message schedule.

The controller maintains a transaction record of times, dates, zone locations, monitored parameters and duration of each message displayed. Each controller may be in communication with a network of fixed location stations from which it receives programming data, message content and scheduling data and to which it transmits the transaction records. The stations process the transaction records to generate advertiser billing and other accounting records. The stations may also be in communication with a master control unit which oversees the stations, performs analysis of the transaction records and billing records and generates advertiser fee schedules as well as revised zone definitions.

It will be appreciated that it is an aspect of the present invention to provide a mobile display system of the general character described which is not subject to the disadvantages of the background history aforementioned.

A feature of the present invention is to provide a mobile display system of the general character described which includes a billboard display panel readily adapted for changing message content.

A consideration of the present invention is to provide a mobile display system of the general character described including a mobile billboard display panel, the panel being driven by an on-board controller which is in communication with a network of fixed stations for programming as well as loading display content and schedules.

Another aspect of the present invention is to provide a mobile display system of the general character described which includes a mobile billboard display panel, the panel being driven by an on-board controller which is in communication with a fixed station for downloading a transaction record of times, dates, geographic locations and duration of each message displayed.

Another consideration of the present invention is to provide a mobile display system of the general character described wherein message content on a mobile billboard display is changeable as a function of a the physical location of the billboard.

A feature of the present invention is to provide a mobile display system with the general character described which includes a mobile billboard display panel having an associated controller which receives signals indicative of the geographic location of the billboard for verification that the message being displayed is in accordance with a prescribed schedule of message content as a function of both time and location.

To provide a mobile display system of the general character described which is relatively low in cost and well suited for implementation by unskilled personnel is a further aspect of the present invention.

A still further aspect of the present invention is to provide a mobile display system of the general character described wherein specific advertisements are displayed when and where the advertisers chooses.

Another feature of the present invention is to provide a mobile display system of the general character described which optimizes exposure of advertising to a target audience at a relatively low cost.

A further consideration of the present invention is to provide a mobile display system of the general character described which is equally suited for use with a variety of message content from general public advertisements to personal messages.

Other aspects, features and considerations of the present invention in part will be obvious and in part will be pointed hereinafter.

With these ends in view, the invention finds embodiment and certain combinations of elements arrangements of parts and series of steps by which the aforesaid aspects, features and considerations and certain other aspects, features and considerations will be attained, all with reference to the accompanying drawings and the scope of which will be more particularly pointed out and indicated in the appended claims.

BRIEF DESCRIPTION OF THE DRAWINGS

In the accompanying drawings in which is shown one of the various possible exemplary embodiments of the invention.

DESCRIPTION OF THE PREFERRED EMBODIMENT

Figure 3:
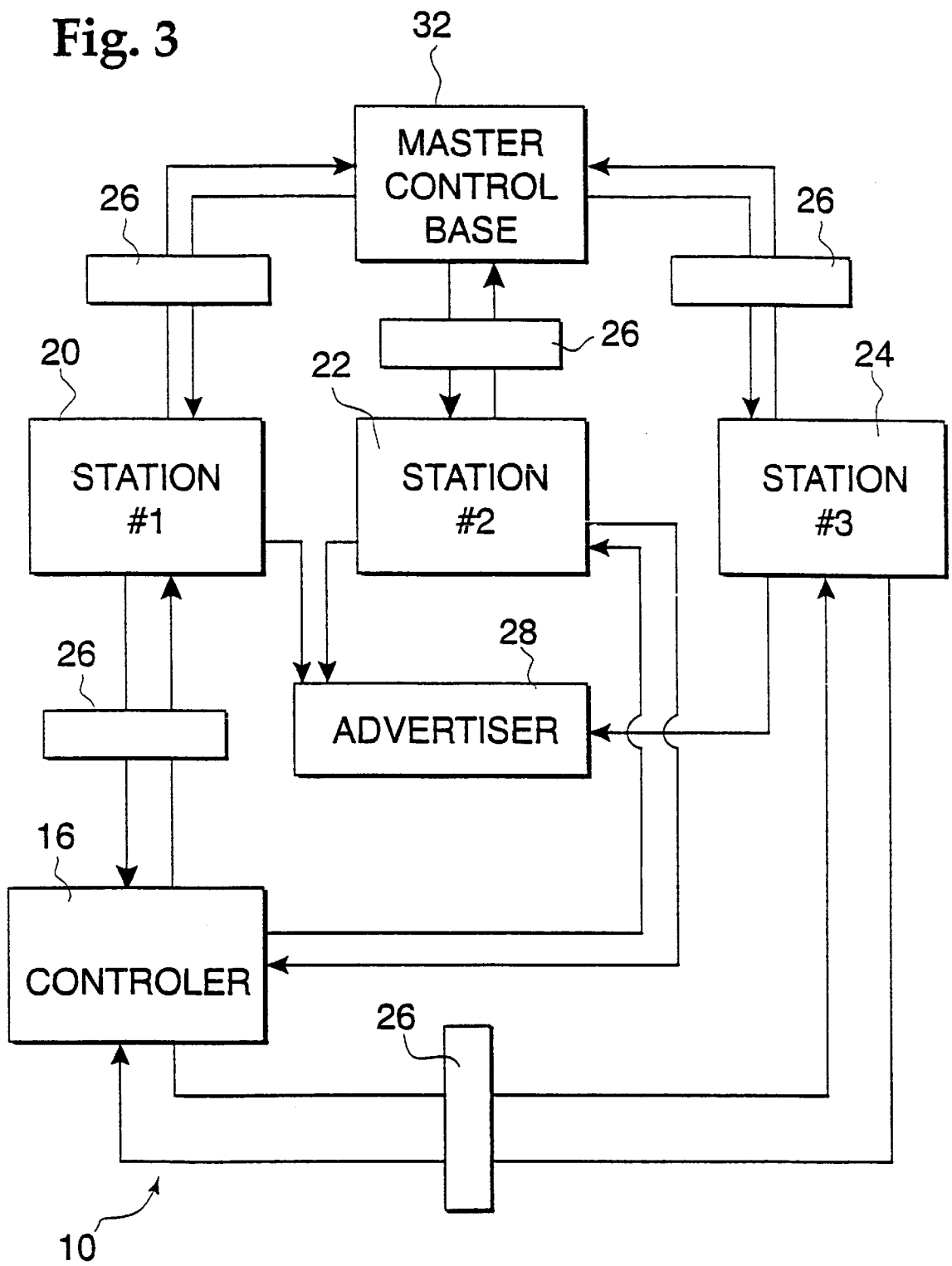
FIG. 3 is a schematized block diagram illustrating data communication flow paths between the display controller and the plurality of fixed stations as well as between the fixed stations and a master control base.

Referring now in detail to the drawings, the reference numeral 10 (FIG. 3) denotes generally a mobile display system constructed in accordance with and embodying the invention. The system 10 includes an operator (hereinafter referred to as a transporter 12) employed to display and transport a mobile viewable changeable display 14. The transporter 12 may also comprise a self-propelled vehicle, cart, trailer or other device upon which the display is carried from place to place and to which the display may be mounted for viewing.

The display 14 may comprise any of a variety of known electronically driven changeable displays including, for example, LED and liquid crystal displays which may be driven in a constantly changeable word string format, such as a "zipper" and may present movable or still picture quality images, lettering or other graphic formats on a generally planar screen. Further, the display 14 may be of any available size and may be supported by a single pole or may be free standing as an easel or tripod or may be carried as a sandwich board; it need not be transported by a human transporter; it may be secured to the roof of an automobile or mounted across the front, sides or rear of a truck, bus or trailer.

Figure 4:
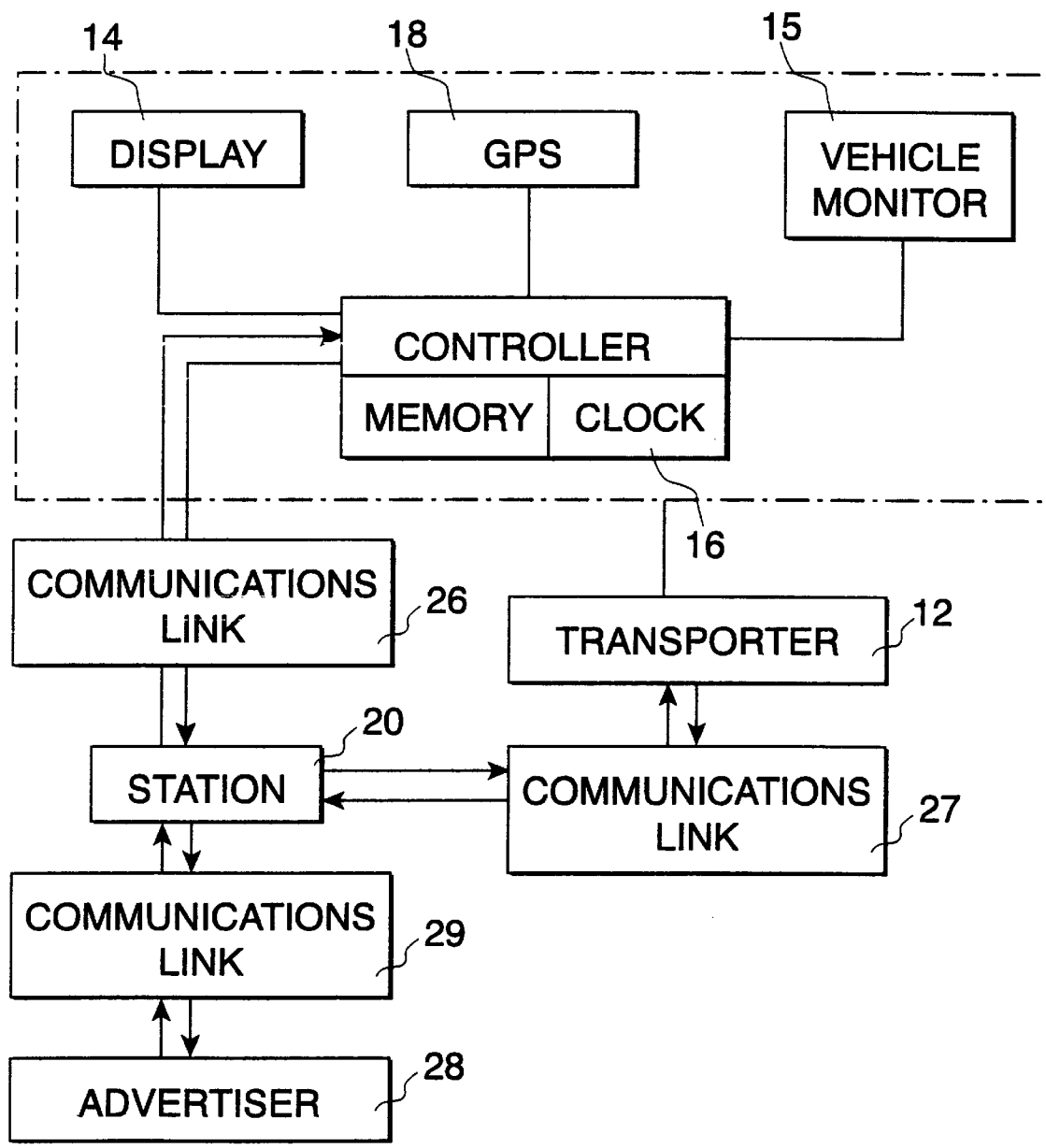
FIG. 4 is a schematized block diagram of the controller including a memory and a clock and in communication with the visual display and a global positioning system receiver, all carried operative associated with the display and a wireless communication link between the controller and the fixed stations.

With reference now to FIG. 4 it will be appreciated that the display is driven by a programmable controller 16 having an associated memory for both program control and task implementation and a clock integrated therewith.

The display 14 can be driven to simultaneously display one or more messages on a single split screen, a single message on one screen or different messages on separate back to back screens 14a, 14b.

The controller 16 is operatively connected to the display 14 or may be carried separately by the transporter 12 and connected to the display 14 through a cable. The controller 16 is programmed to repeatedly ascertain the specific geographic location of the display 14, utilizing a conventional location determining system such as a GPS receiver 18. The present invention encompasses the utilization of any of various known location determining systems such as any of those disclosed in U.S. Pat. No. 5,552,772, incorporated herein by reference.

A status monitor 15 of parameters, e.g. outside temperature, weather, pedestrian and/or vehicle traffic density etc. may be carried by the transporter 12 or mounted to the display 14, e.g. on an interior face together with the controller 16, and receives status data signals indicative of the monitored parameters.

Pursuant to the invention, the controller 16 is in communication with any one or more of a plurality of fixed location stations 20, 22, 24, with the station 20 being depicted in FIG. 4 of the drawings. A communications link 26 interconnecting the controller 16 and the station may comprise a conventional cellular link, radio signal broadcast communication or other known wireless communication system. Alternately, a communication link may be established with the stations through a cabled telephone central station network.

Through the communications link 26, the controller 16 receives programming data, display message content data as well as associated scheduling data for one or a plurality of different display messages. The data downloaded by the controller from the station is stored in the controller memory. The controller 16 thereafter drives the display 14 with the appropriate display message content coordinated for the display location as monitored by the GPS receiver 18 and the date and time of day, as ascertained from an internal system clock, as well as the monitored parameters.

The controller 16 also functions to generate a transaction record comprising data reflecting the dates, times of day and duration of each message displayed as well as the physical location where each message was displayed and the monitored parameters. The transaction records are stored in the controller memory.

In the event the controller detects that the display 14 has been moved into a location zone for which the particular message being displayed is not designated, the controller is programmed to communicate with a fixed station for the purpose of advising the fixed station of its present location and receiving a new message appropriate for the present display location.

Alternately, the controller will select a message stored in the memory which is appropriate for the new physical location.

Similarly, if a monitored parameter is not in accordance with that specified for the message, e.g. display is in a zone where it is raining and advertiser does not wish to display sunscreen message, etc., the controller selects an alternate message from the memory or receives a new message from the station.

Additionally, a voice or data communications link 27 between a station 20 and the transporter 12 is employed to give the transporter specific instructions as to the presently desired location of the display and/or a schedule of times and locations. Such instructions may also include instructions for programming the controller 16 for message content.

Further the advertiser 28 may access a station via a communications link 29, e.g. on-line through a modem to a web site, via E-mail etc., for message content and scheduling. The station communicates such information directly to the controller 16 via the link 26 or to the transporter 12 via the link 27 with the transporter programming the controller 16. The communications link 27 may be a cellular, voice, wireless, non voice, e.g. pager message, or wired telephone.

In accordance with the invention, the transaction records stored in the controller memory as well as current status data, e.g. exact location, monitored parameter status etc. are periodically downloaded to one of the stations 20, 22, 24. Preferably, the station in the closest proximity to the transporter 12 will be selected for communication with the controller 16.

The stations 20, 22, 24 process the current status data to monitor display density, i.e. number of displays each zone, and will communicate with the controllers to display alternate messages if the transporter density displaying a selected message is greater than specified. The stations also process the transaction records to generate periodic advertiser billing which identifies the displayed message, the physical locations wherein such message was displayed, the dates and times, and monitored parameters and the charges due based upon the appropriate billing rates (which can vary based upon location, time of day, monitored parameters, and density). The advertiser billing is transmitted to an advertiser 28 via conventional mail, E-mail, facsimile or other means.

Pursuant to the invention, the individual fixed location stations 20, 22 and 24 store advertiser profiles, message content and coordinated scheduling data. The stations transmit data to the controller 16 in the form of programming data, message content and scheduling information.

The fixed location stations 20, 22 and 24 may also be in communication with a master control base 32 which receives the transaction data and billing data, accesses memory stored customer profiles and serves an overseeing function which includes analysis of the transaction and billing records, revision of fee schedules, revision of physical zone definitions and disaster recovery functions for the stations.

Figure 1:
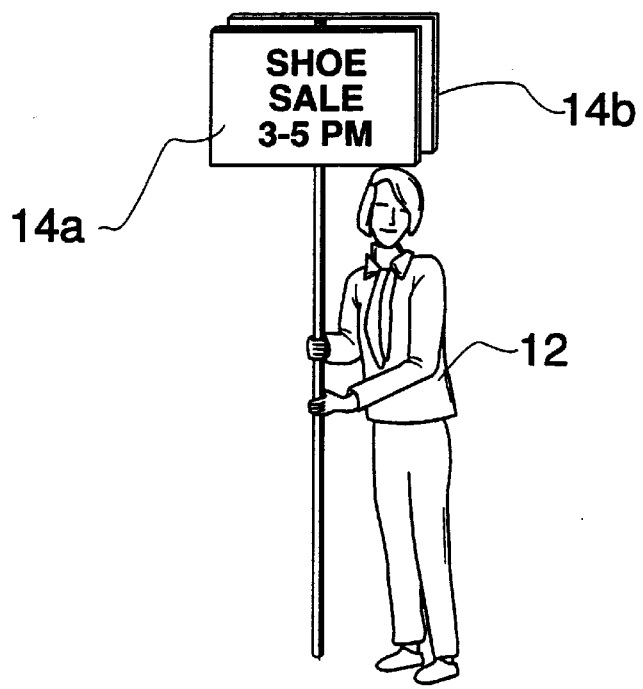
FIG. 1 is a perspective view of a typical mobile billboard display in accordance with and embodying the present invention.
Figure 2:
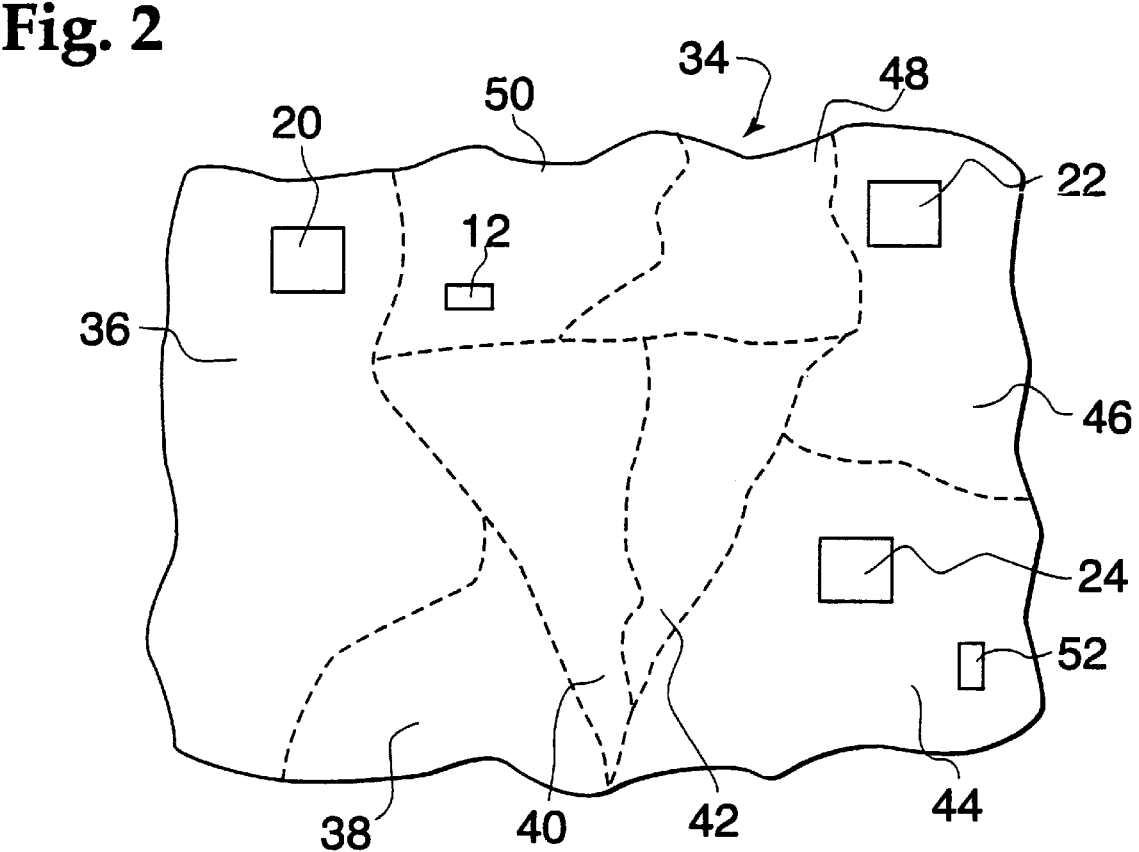
FIG. 2 is a fragmentary plan view of a typical geographic area within which the billboard may move with the geographic area being divided into zones defined by broken lines and with a plurality of fixed stations positioned within certain of the zones and being in selective communication with a display associated controller.

Turning now to FIG. 2 wherein a typical geographic region 34 is depicted, the geographic region is divided into various zones 36, 38, 40, 42, 44, 46, 48 and 50 by a plurality of dashed boundary lines. The geographic zones have been defined by the base 32 or the fixed stations and can be customized for a specific message.

It will be noted that the transporter 12 is shown, in an exemplary mode, as being presently located in the zone 50 and that a further transporter 52, is located in the zone 44. The station 20 is shown as being located in the zone 36, the station 22 in the zone 46 and the station 24 in the zone 44.

The controller 16 will, under usual conditions, be in communication with the most proximate station, station 20 while the controller associated with the display of the transporter 52 will be in communication with the station 24. If the transporter 12 traverses into the zone 48 and the message carried in the display is not scheduled for display in the zone 48, upon detection that the display 14 is in the zone 48, the controller 16 will either communicate with the most proximate station 22, for example, to receive a message designated for display in the zone 48 or will select a message designated for display in the zone 48 from its memory. Alternately, the communications link 27 will be utilized to advise the transporter to move into a different zone.

Thus it will be seen that there is provided a mobile display system which achieves the various aspects, features and considerations of the present invention and which is well suited to meet the conditions of practical usage.

As various possible embodiments might be made of the present invention and as various changes might be made in the embodiment above said forth, it is to be understood that all matter herein described or shown in the accompanying drawings is to be interpreted as illustrative and not in a limiting sense.

Having thus described the invention, there is claimed as new and desired to be secured by Letters Patent:

1. A mobile system for conveying messages, the system including a display, a transporter associated with the display for moving the display from one location to another, a controller associated with the display for driving the display to generate a visual message, a fixed station located remote from the display, an advertiser located remote from the display, a communications link between the advertiser and the station for transmitting visual message content and scheduling data from the advertiser to the station, a communications link between the station and the controller for transmitting visual message content and scheduling data, the controller driving the display to generate the visual message content pursuant to the scheduling data.

2. A mobile system for conveying visual messages as constructed in accordance with claim 1 wherein the communications link between the advertiser and the station comprises an on-line link.

3. A mobile system for conveying messages over a region segregated into zones, the system comprising a movable display, the display carried by a transporter, a controller associated with the display, the controller being operably connected to the display, the controller driving the display to generate a publicly viewable message selected for a first zone within which the display is located, means operably connected to the controller for generating signals indicative of the geographic location of the display, the controller receiving the signals indicative of the geographic location of the display and determining when the display has entered a different zone for which the message has not been selected for display and driving the display to generate a different message selected for display in the different zone.

4. A mobile system for conveying messages as constructed in accordance with claim 3 further including at least one fixed location station, a communications link between the controller and the station, the controller being programmed to communicate with the station when the display enters the different zone, the station being programmed to transmit the different message selected for display in the different zone to the controller.

5. A mobile system for conveying messages as constructed in accordance with claim 3 wherein the controller includes an associated memory, the memory storing the different message, the controller retrieving the different message from the memory.

6. A mobile system for conveying messages as constructed in accordance with claim 3 wherein the controller includes an associated memory, the selected message including an associated schedule of zone(s), time and date for display of the selected message, the controller being programmed to drive the display to generate the selected message in accordance with the schedule.

7. A mobile system for conveying messages as constructed in accordance with claim 3 further including a fixed location station, a communications link between the controller and the station, the controller being programmed to generate a transaction record of each message displayed, the controller being programmed to transmit the transaction record to the station, the station receiving such record and in response thereto generating accounting records for billing associated with each message displayed.

8. A mobile system for conveying messages as constructed in accordance with claim 7 wherein the transaction record includes a record of times and dates of each message displayed.

9. A mobile system for conveying messages as constructed in accordance with claim 8 wherein the transaction record further includes a record of zones.

10. A mobile system for conveying messages as constructed in accordance with claim 7 further including a status monitor operatively connected to the controller, the status monitor monitoring parameters associated with the display environment and generating signals representative of the monitored parameters, the controller receiving the signals representative of the monitored parameters, the transaction record including a record of the monitored parameters and the accounting records including information processed from the monitored parameters.

11. A mobile system for conveying messages as constructed in accordance with claim 7 a communications link between the controller and the station, the station being programmed to transmit the publicly viewable message and the different messages to the controller.

12. A mobile system for conveying messages as constructed in accordance with claim 3 further including a fixed location station, a communications link between the controller and the station, the station being programmed to transmit the publicly viewable message and the different message to the controller.

13. A mobile system for conveying messages as constructed in accordance with claim 3 further including a plurality of fixed location stations and a selective communications link between each station and the controller, the stations being programmed to generate the data comprising message content for the messages and data comprising scheduling associated with the messages, the stations transmitting the message content and scheduling data to the controller, the controller being programmed to transmit a transaction record of the messages displayed to the stations, the system further including a master control base and a communications link between the stations and the base.

14. A mobile system for conveying visual messages to the public, the system including at least one transporter, an external display carried by the transporter, a controller associated with the display, the controller being operably connected to the display for driving the display to generate messages viewable by the public, the controller including a memory, the memory storing at least one message and scheduling information for display of the one message, the scheduling information including information relating to the desired physical location for display of the one message, the scheduling information further including the time of day within which the one message is to be displayed, the system further including means for generating a signal indicative of display location, the controller including clock means for determining the time of day, the controller accessing the signal indicative of display location and the clock means and driving the display to generate the message in accordance with the schedule.

15. A mobile system for conveying visual messages to the public as constructed in accordance with claim 14 wherein the system further includes at least one fixed station, a communications link between the controller and the station, the controller being programmed to generate a transaction record of messages displayed and for transmitting such transaction record to the station, the station being programmed to transmit data comprising messages and associated schedules to the controller, the station receiving the transaction record and in response thereto creating an accounting record of charges associated with the messages displayed.

16. A mobile system for conveying visual messages as constructed in accordance with claim 14 wherein the transporter comprises a vehicle.

17. A mobile system for conveying visual messages as constructed in accordance with claim 14 wherein the transporter comprises a person.

\* \* \* \* \*